J. A. FREEMAN.
PORTABLE BACK REST.
APPLICATION FILED OCT. 6, 1911.
1,030,511.
Patented June 25, 1912.
3 SHEETS—SHEET 1.
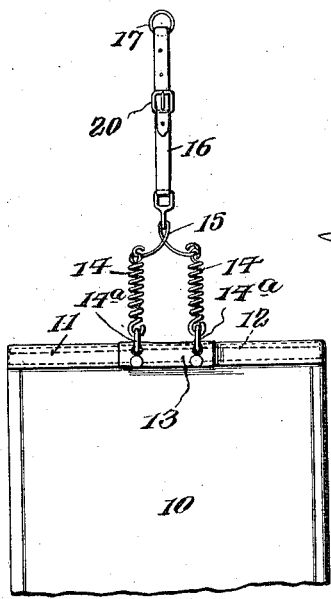
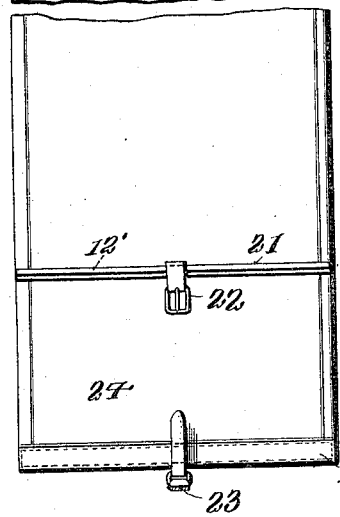
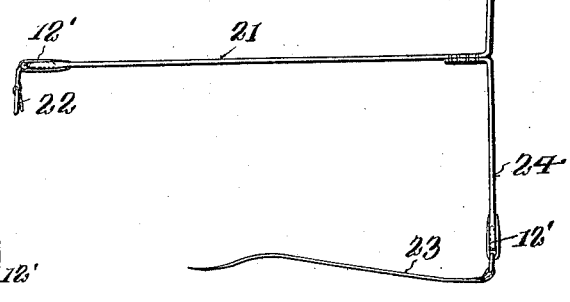
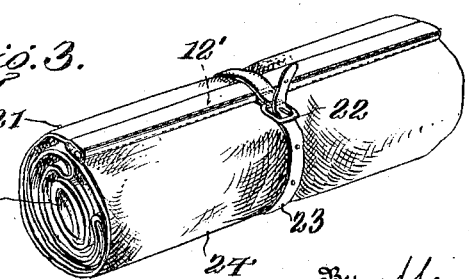
Inventor
John A. Freeman
By Meyers, Cushman & Rea
Attorney J. A. FREEMAN.
PORTABLE BACK REST.
APPLICATION FILED OCT. 6, 1911.
1,030,511.
Patented June 25, 1912.
3 SHEETS—SHEET 2.
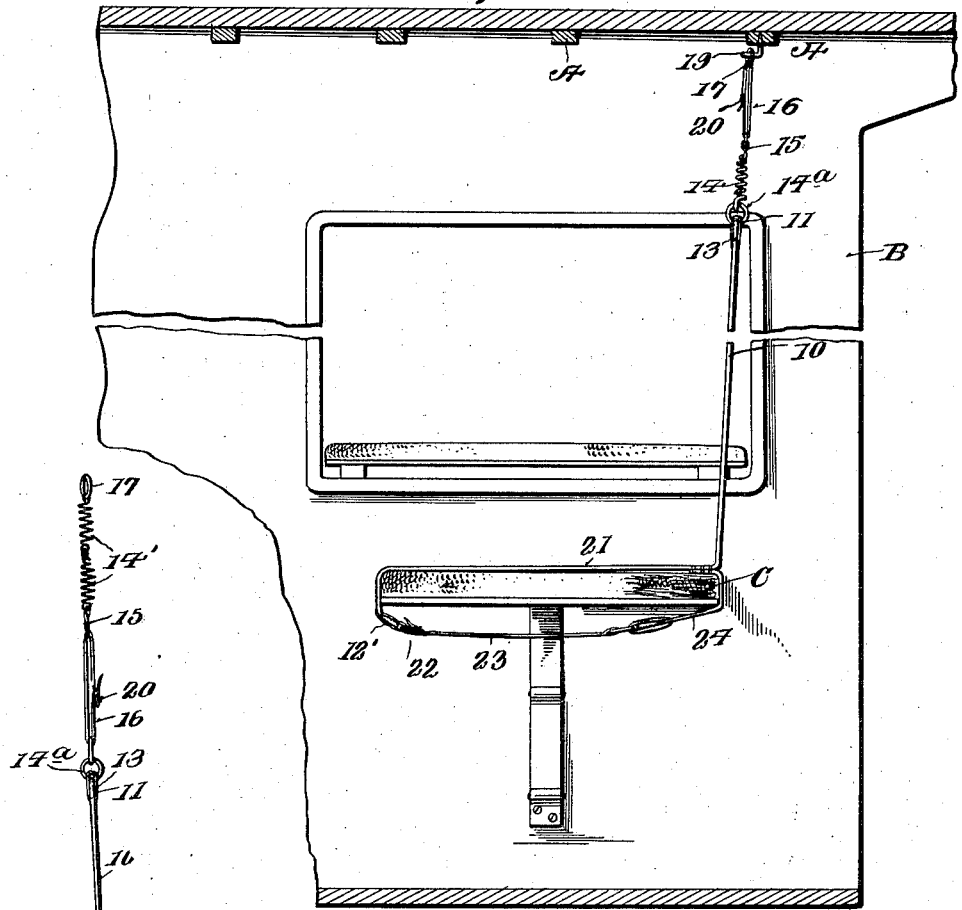
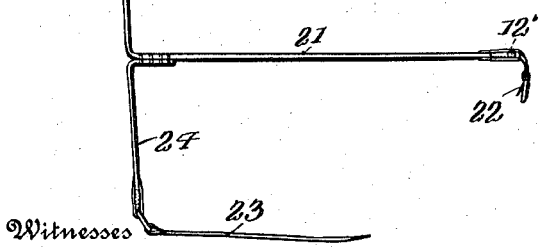
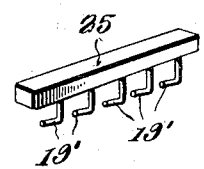
Inventor
John A. Freeman
Witnesses
By Meyers, Cushman & Rea
Attorney

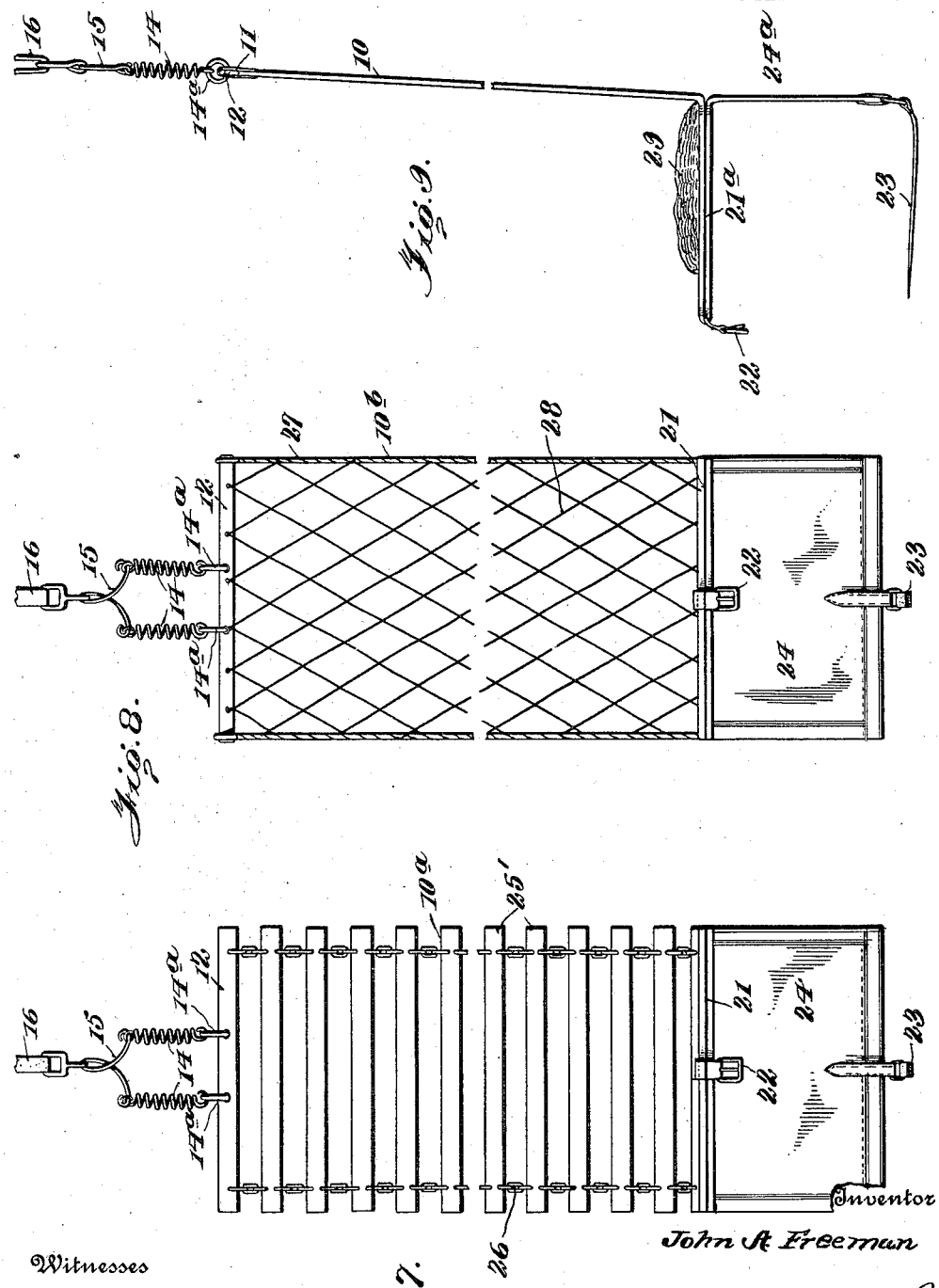

UNITED STATES PATENT OFFICE.

JOHN A. FREEMAN, OF MONTGOMERY, ALABAMA.

PORTABLE BACK-REST.

1,030,511. Specification of Letters Patent. Patented June 25, 1912.

Application filed October 6, 1911. Serial No. 653,217.

*To all whom it may concern:*

Be it known that I, JOHN A. FREEMAN, a citizen of the United States, residing at Montgomery, in the county of Montgomery and State of Alabama, have invented new and useful Improvements in Portable Back-Rests, of which the following is a specification.

This invention relates to an improvement in portable backs for seats, and has particular reference to back supports for locomotive cab seats and the like.

The principal object of this invention is to afford means upon a locomotive for supporting the backs of the engineer and fireman when sitting so as to relieve the back from the constant strain when sitting erect for hours at a time during long runs.

Another object of this invention is to provide an attachment for a locomotive cab seat which supports the engineer's back when sitting, which may be quickly and easily detached from the cab seat and folded into compact form to be carried by each engineer as his own property, and which may be readily applied to any locomotive cab in which the engineer assumes control.

A further object of this invention is to provide a back capable of attachment to a seat in either side of the cab of the locomotive without any modification in the structure of the back, so that the fireman may have a suitable back support to relieve the back from the constant strain during long runs.

The invention still further contemplates an attachment of this character which is of comparatively simple construction, may be readily folded, is light in weight and may be easily carried in one hand, and an attachment which may be economically manufactured, and sold at a low cost so that it may be acquired as the personal property of each engineer and fireman.

Broadly, the invention comprises a flexible back having a seat attaching portion at its lower end adapted for securement to the seat in the locomotive cab, the upper end of the back being adjustably and detachably suspended from the roof of the cab, the detachable feature admitting of the quick removal of the back from the roof of the cab, whereupon the flexible back may be hung outwardly through the window, and the cab seat may be folded down, the entire device thus being out of the way.

Other objects and advantages will appear from the following description of the present embodiment of the invention, the same being illustrated in the accompanying drawings in which—

Figure 1 is a side elevation of the improved back rest. Fig. 2 is a front elevation of the same. Fig. 3 is a perspective view of the back rest as it appears when rolled. Fig. 4 is a side elevation of the rest applied to the locomotive cab seat. Fig. 5 is a side elevation of the rest disclosing a modified form of suspension means for the same. Fig. 6 is a perspective view of one means for attaching a row of supporting pins to the roof of the cab. Fig. 7 is a front elevation of a modified form of the back of the device. Fig. 8 is a similar view disclosing another modified form of the back. Fig. 9 is an edge view of the device disclosing a slight modification in its structure.

Referring to the drawings, in which like parts are designated by similar numerals of reference throughout the several views, the device is disclosed, preferably, in the form of a strip of canvas of suitable width providing a back 10 having its upper edge turned over and stitched, as at 11, and inclosing a stretching rod 12 adapted to hold the strip of canvas extended. A reinforcement 13 in the form of a portion of canvas, is placed over the upper edge of the back 10 midway of the ends of the turned-over portion 11. A pair of helical or coil springs 14 are attached at their lower ends to the upper edge of the back 10 by rings 14$^a$ passing through the turned-over portion 11 and about the stretching rod 12. The springs 14 are joined at their upper ends by a connector 15, the springs being spaced apart and held in parallelism by the connector, the connector being of any suitable form, but preferably, as shown, comprising a length of wire curled at its ends for the reception of the springs 14 and having an eye at its middle portion to which is connected an adjustable suspension strap 16. A supporting ring 17 is carried upon the upper end of the strap 16 and is adapted to detachably engage over the pin 19. The strap 16 is adjustable by a buckle 20 connecting the ends of the strap after the same have been passed through the connector 15 and the ring 17. The lower end of the back 10 is turned to project forwardly forming a seat portion 21, the latter being provided at its outer edge with a stretching rod 12' holding the seat portion extended. A buckle 22 is secured to the seat portion 21 and receives the end on the seat strap 23 carried upon a depending extension 24. The extension 24 depends from the lower end of the back 10 and is adapted to be looped under the seat to which the improved device is applied.

If preferred, the suspension means for the back 10 may be in the form disclosed in Fig. 5 in which the helical springs 14' are arranged in longitudinal alinement and are attached directly to the supporting ring 17, while the suspension strap 16 is carried between the springs 14' and the back 10, a snap hook 15' or other connecting means being employed between the lower spring 14' and the strap 16. The preferred form of suspension means is adapted particularly to hold the back 10 from tilting edge-wise as the helical springs 14 support the back at spaced points.

The pin 19 is adapted to be positioned in substantially a horizontal plane, the same being tilted upwardly at a slight angle so as to hold the supporting ring 17 in position by the weight of the back 10 and its adjacent parts, and to admit of the sliding of the supporting ring 17 from the pin when it is desired to quickly remove or drop the back.

In place of the single supporting pin 19 disclosed in Fig. 4, a horizontal strip or bar 25, Fig. 6, may be employed which is provided with a plurality of horizontally spaced pins 19' which depend therefrom and have their lower ends bent forwardly and slightly upward for the reception of the supporting ring 17. This bar 20 is employed when it is desired to adjust the position of the back longitudinally above the seat.

In Fig. 7 is disclosed a slightly modified form of the device in which the back 10ª is made up of a plurality of spaced slats 25' hingedly connected by suitable links 26, admitting of the rolling or folding of the back.

In Fig. 8 is disclosed another form of back 10ᵇ, in which the supporting or stretching rod 12 carries at its ends lengths of heavy cord 27 extending down to the seat portion 21 and supporting therebetween a meshing 28 of finer cord providing a flexible back.

In Fig. 9 is disclosed a modification in the formation of the seat portion 21ª and the extension 24ª. In this construction the back 10 is turned forwardly and looped upon itself to provide a seat portion of double thickness, the returned end of the seat portion 21ª being turned downwardly to provide the extension 24ª. If preferred, the seat portion 21ª may be provided with a suitable cushion 29 of adaptable construction and thickness.

In application, the pin 19 is secured to the rafter A in the cab B directly over the cab seat C. The back 10 is hung over the cab seat C by the ring 17 engaging with the pin 19, and the extension 24 is lapped over the rear edge of the seat C and held in such position by the strap 23 passing forwardly against the underside of the seat. The seat portion 21 is disposed over the seat C, and has its outer end lapped down about the forward edge of the seat C and held in position by engagement of the strap 23 with the buckle 22. It is thus observed that the back rest can be applied to the locomotive cab by simply securing the strap 23 about the seat C and hanging the supporting ring 17 over the pin 19. In switching, when the engineer is required to reverse his position upon the seat C or fold the same down out of the way, the supporting ring 17 can be quickly withdrawn from the pin 19, and the back 10 hung out through the window of the cab, the same being held in such position by the weight of the suspension means. When the back 10 is hung through the window the seat C may be readily folded down out of the way without detaching the back rest therefrom.

From the foregoing it will be observed that this improved attachment may be rolled or folded up into compact form, the same being adapted to weigh but between two and four pounds, admitting of the carrying of the same in one hand. When the strip 25 is employed the same is adapted for securement across the lower edges, or between the rafters A, so that the back 10 may be adjusted longitudinally of the seat to accommodate the back of the person.

In each instance the back 10 may be of any suitable height, but preferably of sufficient height to provide a head rest for the engineer when seated.

Having thus described the invention what I claim as new is:—

1. A portable back rest comprising a strip of flexible material, springs attached to the upper end of the flexible strip for supporting the same vertically, an adjustable strap connected to the upper ends of the springs, a ring on the strap adapted for detachable engagement over a fixed pin, a seat portion on the lower end of the back adapted to stretch over a seat, a flap depending from the back at the inner edge of the seat portion, and a strap on the flap adapted to extend beneath the underside of the seat and engage the forward edge of the seat portion to hold the same to the seat.

2. A portable back rest comprising a strip of flexible material adapted to be folded, suspension means attached to one end of the strip for supporting the same vertically to provide a back, the lower end of said strip being folded upon itself to provide a seat portion for engagement across a seat and a flap at the lower end of the back for engagement around the inner edge of the seat, a buckle carried on the outer end of the seat portion, and a strap carried on the end of the flap adapted to pass beneath the seat and engage with the buckle to hold the seat portion to the seat, said strap and buckle being also adapted to hold the device together when folded.

In testimony whereof I have hereunto set my hand in presence of two subscribing witnesses.

JOHN A. FREEMAN.

Witnesses:
J. J. CAMPBELL,
J. G. HAMMOND.

Copies of this patent may be obtained for five cents each, by addressing the "Commissioner of Patents, Washington, D. C."